(12) United States Patent
Bhattacharjya

(10) Patent No.: US 6,813,367 B1
(45) Date of Patent: Nov. 2, 2004

(54) METHOD AND APPARATUS FOR SITE SELECTION FOR DATA EMBEDDING

(75) Inventor: Anoop Bhattacharjya, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 948 days.

(21) Appl. No.: 09/659,197

(22) Filed: Sep. 11, 2000

(51) Int. Cl.$^7$ ................................................. G06K 9/00
(52) U.S. Cl. ....................... 382/100; 382/176; 382/190; 382/202
(58) Field of Search ................................. 382/100, 165, 382/176, 181, 190, 202, 257, 260, 321; 380/201, 202, 203; 358/3.28; 713/165, 170, 176, 178

(56) References Cited

U.S. PATENT DOCUMENTS

| | | | |
|---|---|---|---|
| 5,315,098 A | 5/1994 | Tow | 235/494 |
| 5,699,427 A | 12/1997 | Chow et al. | 705/58 |
| 5,710,636 A | 1/1998 | Curry | 358/3.28 |
| 5,710,834 A | 1/1998 | Rhoads | 382/232 |
| 5,734,752 A | 3/1998 | Knox | 358/3.28 |
| 5,761,686 A | * 6/1998 | Bloomberg | 715/529 |
| 6,389,163 B1 | * 5/2002 | Jodoin et al. | 382/173 |
| 6,438,251 B1 | * 8/2002 | Yamaguchi | 382/100 |
| 6,580,804 B1 | * 6/2003 | Abe | 382/100 |
| 6,600,828 B1 | * 7/2003 | Kawamura | 382/100 |

OTHER PUBLICATIONS

Brassil, et al. discloses "Electronic marking and identification techniques to discourage document copying", IEEE, pp. 1278–1287, 1994.*

Bhattacharjya, et al. discloses "Data embedding in text for a copier system", IEEE, pp. 245–249, Oct. 1999.*

* cited by examiner

Primary Examiner—Daniel Mariam

(57) ABSTRACT

A differential color or luminance signal is used to embed a binary message in selected stroke segments in the text of a document and for extracting a message so embedded. The bits representing the message are embedded in the stroke segments by modifying a color or luminance value of pixels in one region of a selected stroke with respect to such a value of pixels in a second region of that stroke. To determine whether a bit is embedded in a stroke segment, a value representative of the luminance or color of pixels in the one region is compared with a value representative of the luminance or color of pixels in the second region. The presence or absence of a bit is determined by whether the difference between the two values is greater than a minimum predetermined threshold.

54 Claims, 11 Drawing Sheets

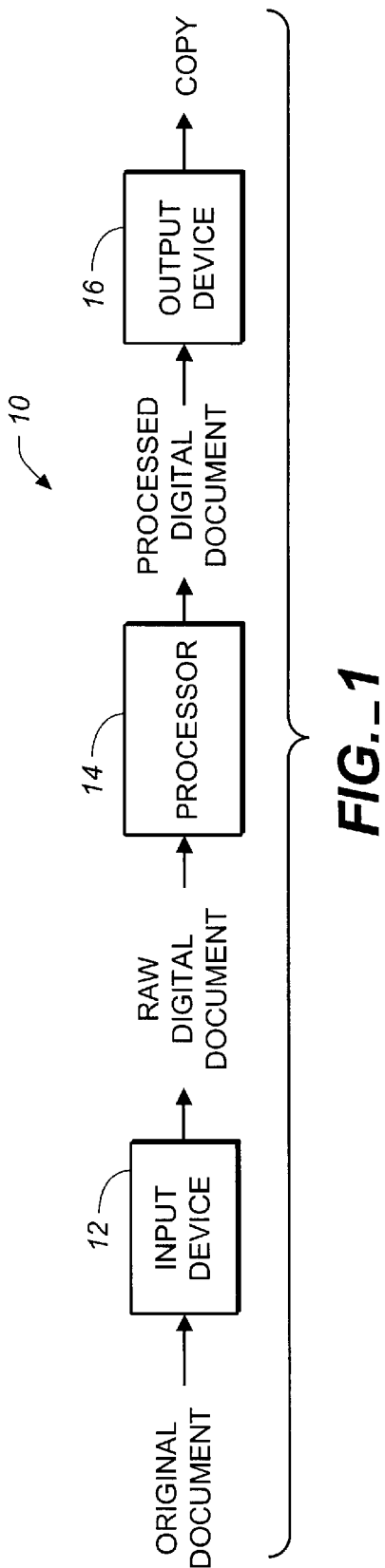

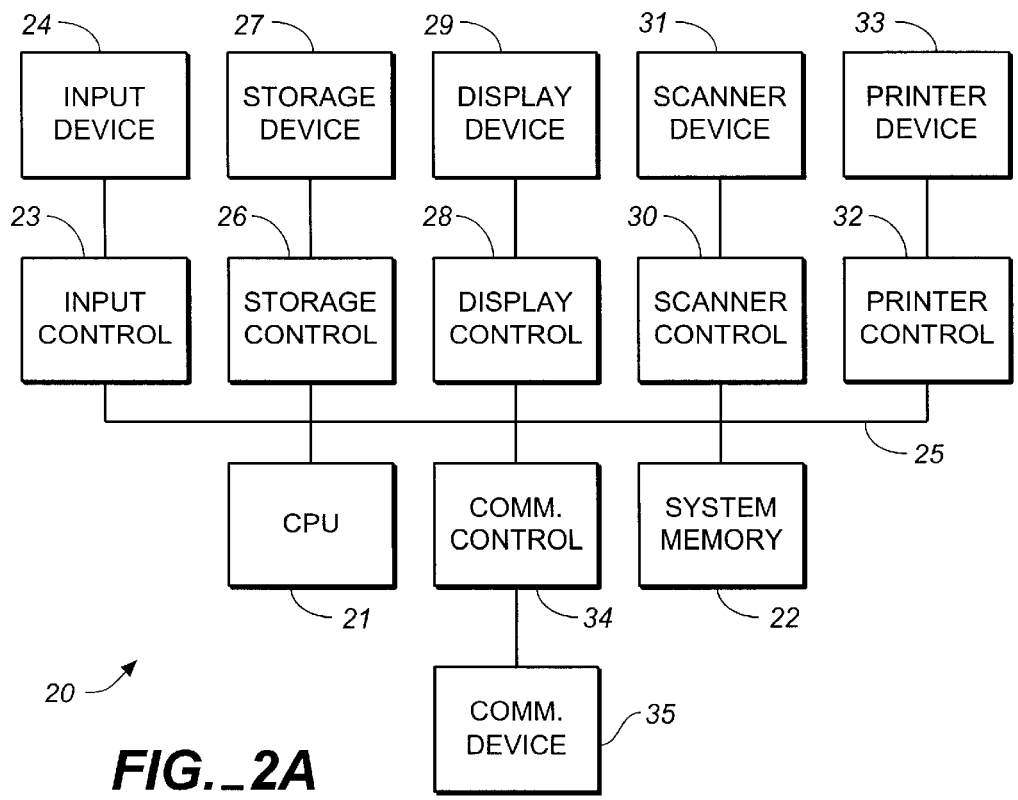
FIG._2A
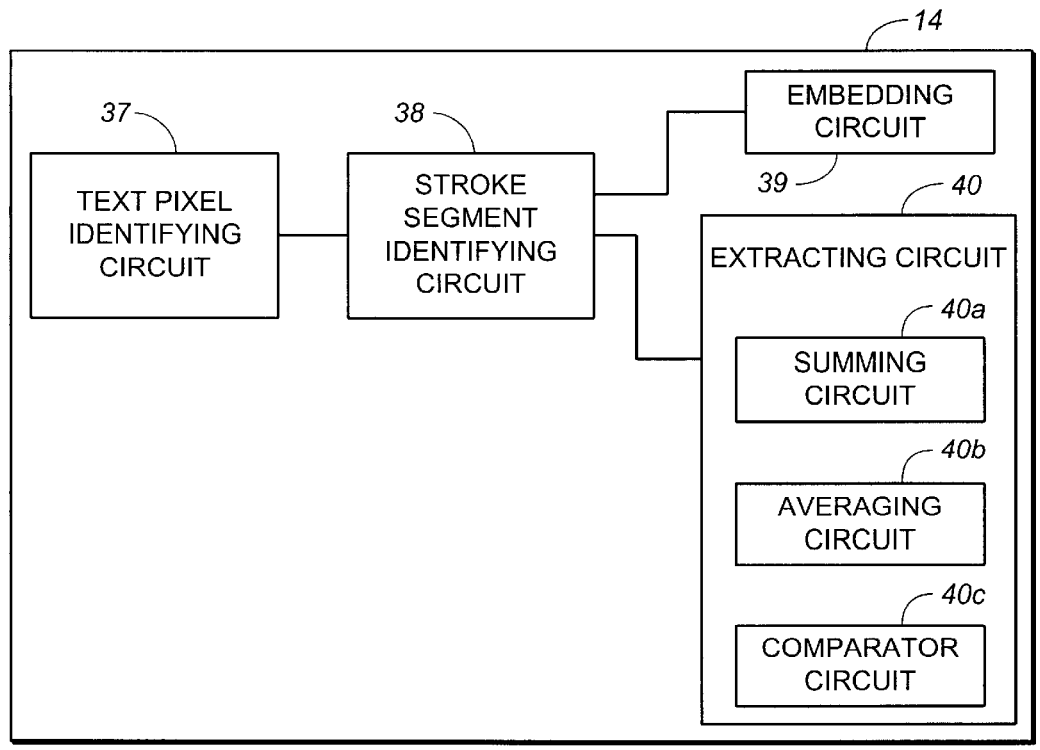
FIG._2B

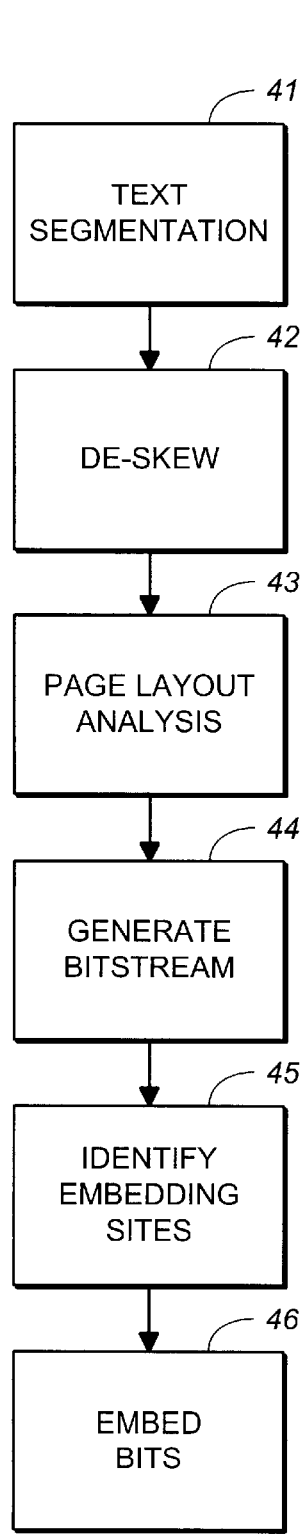
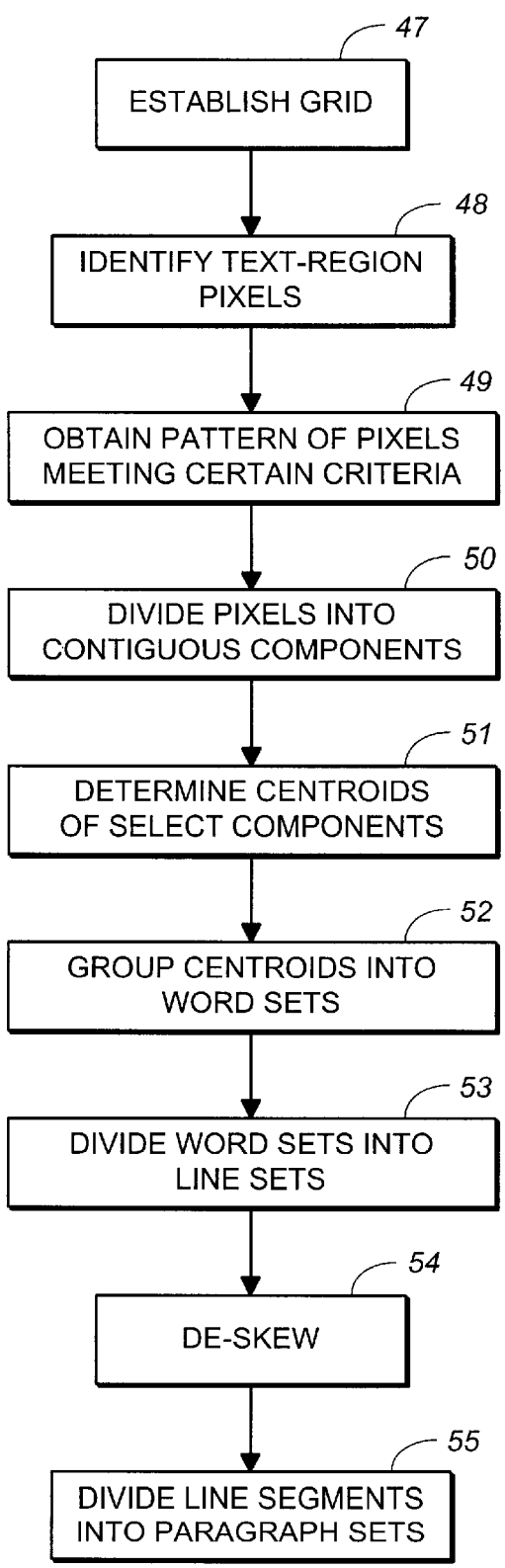
FIG._3
FIG._4

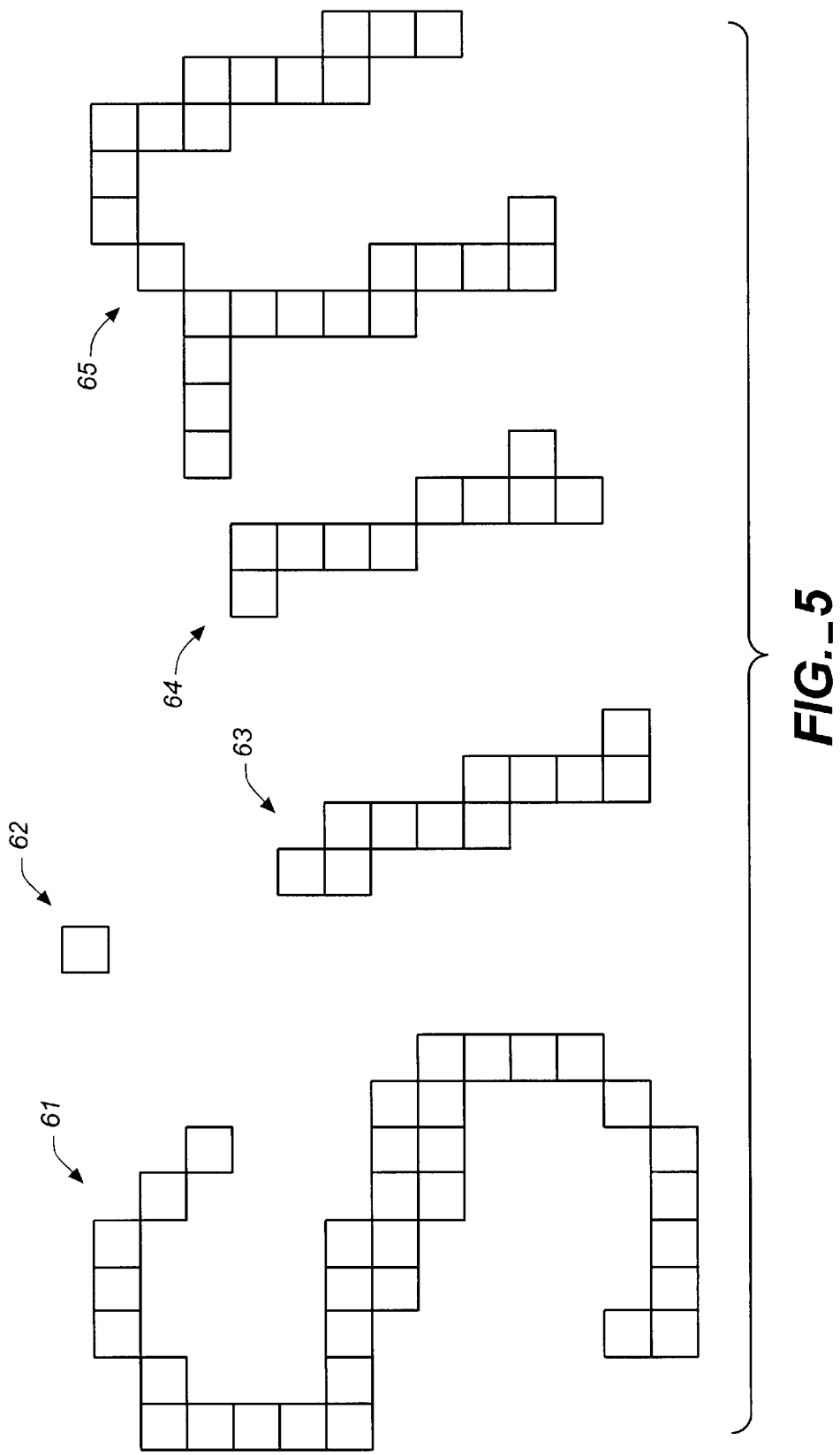
FIG._5

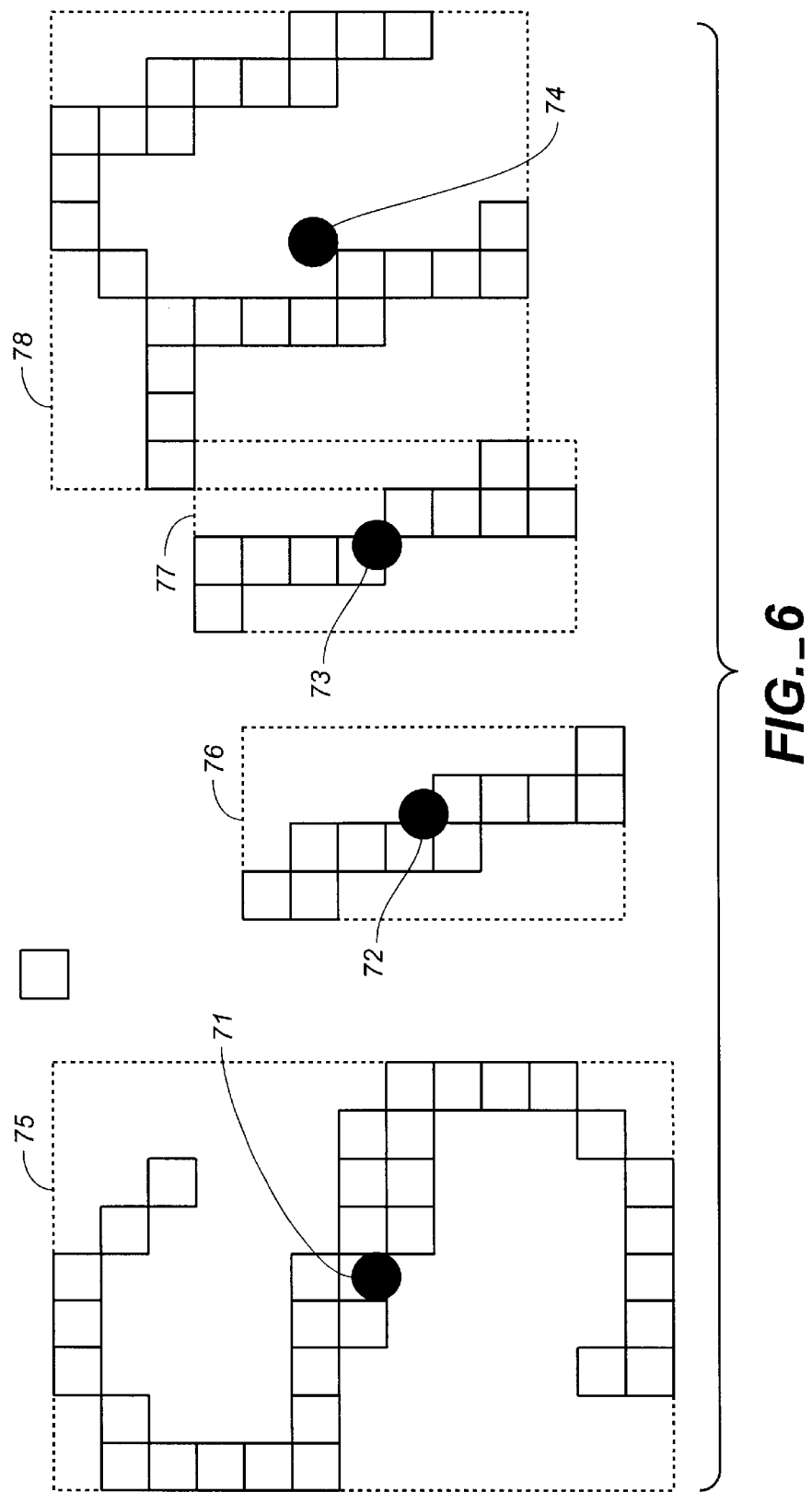
FIG._6

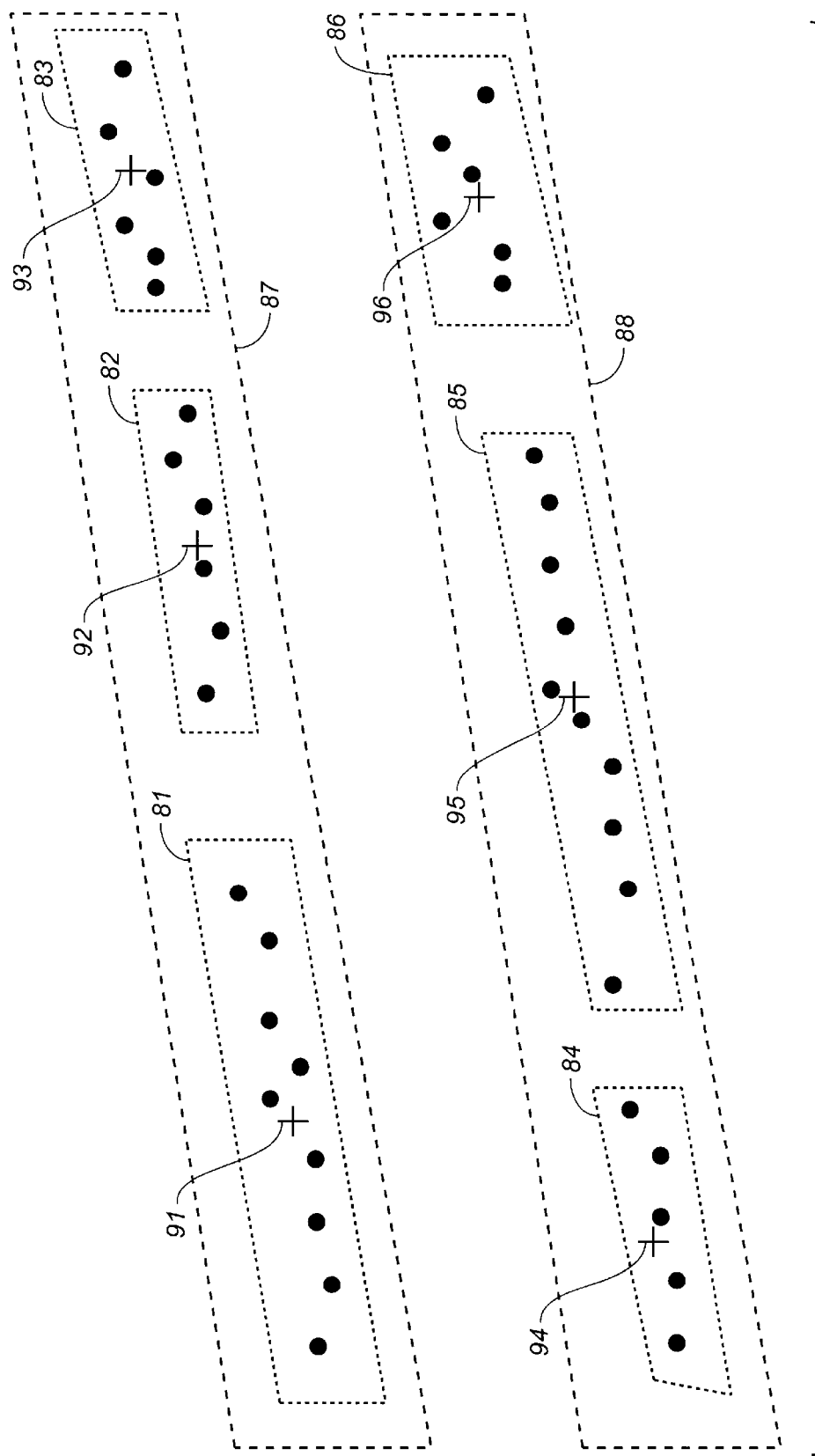
FIG._7

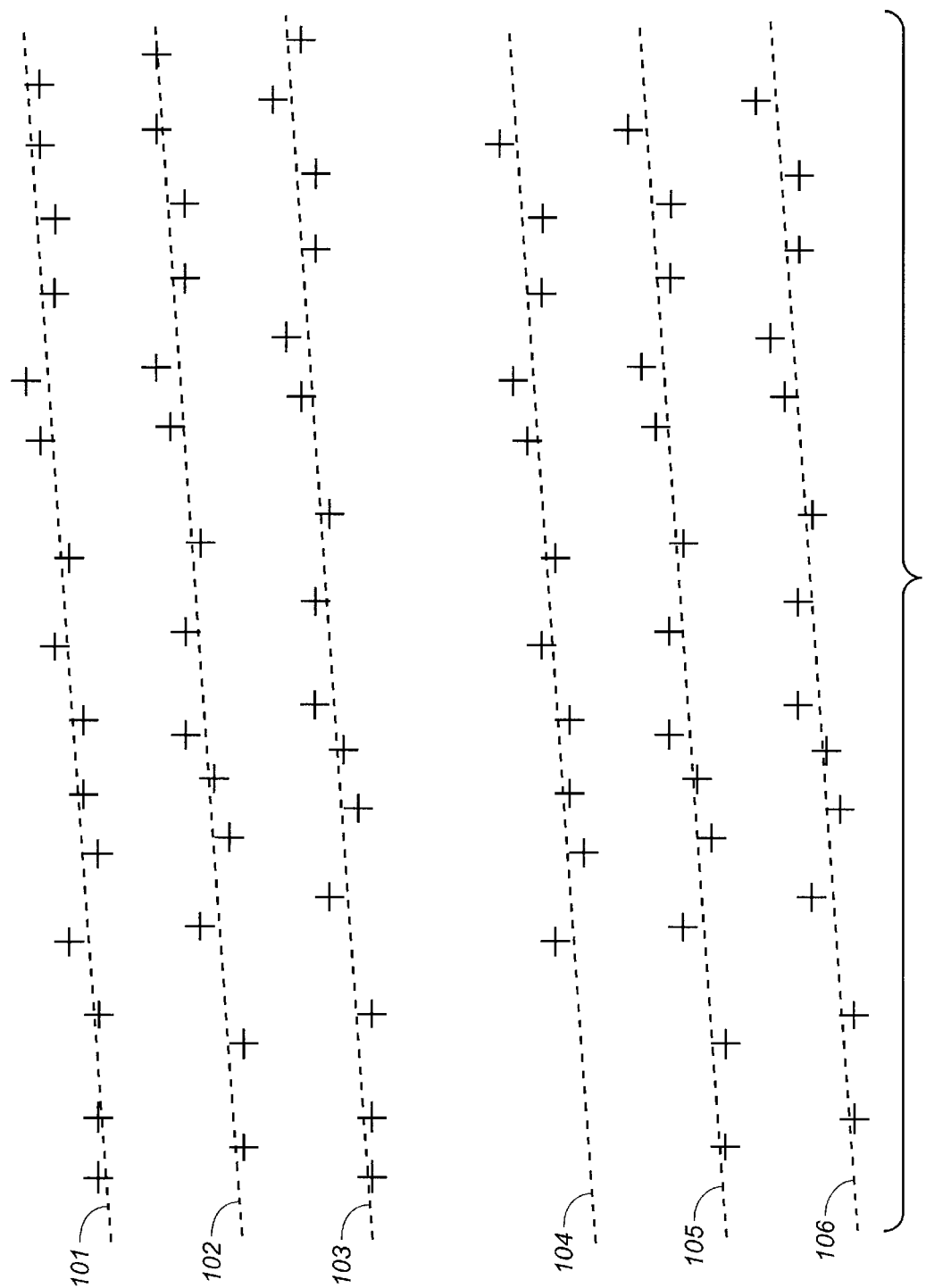

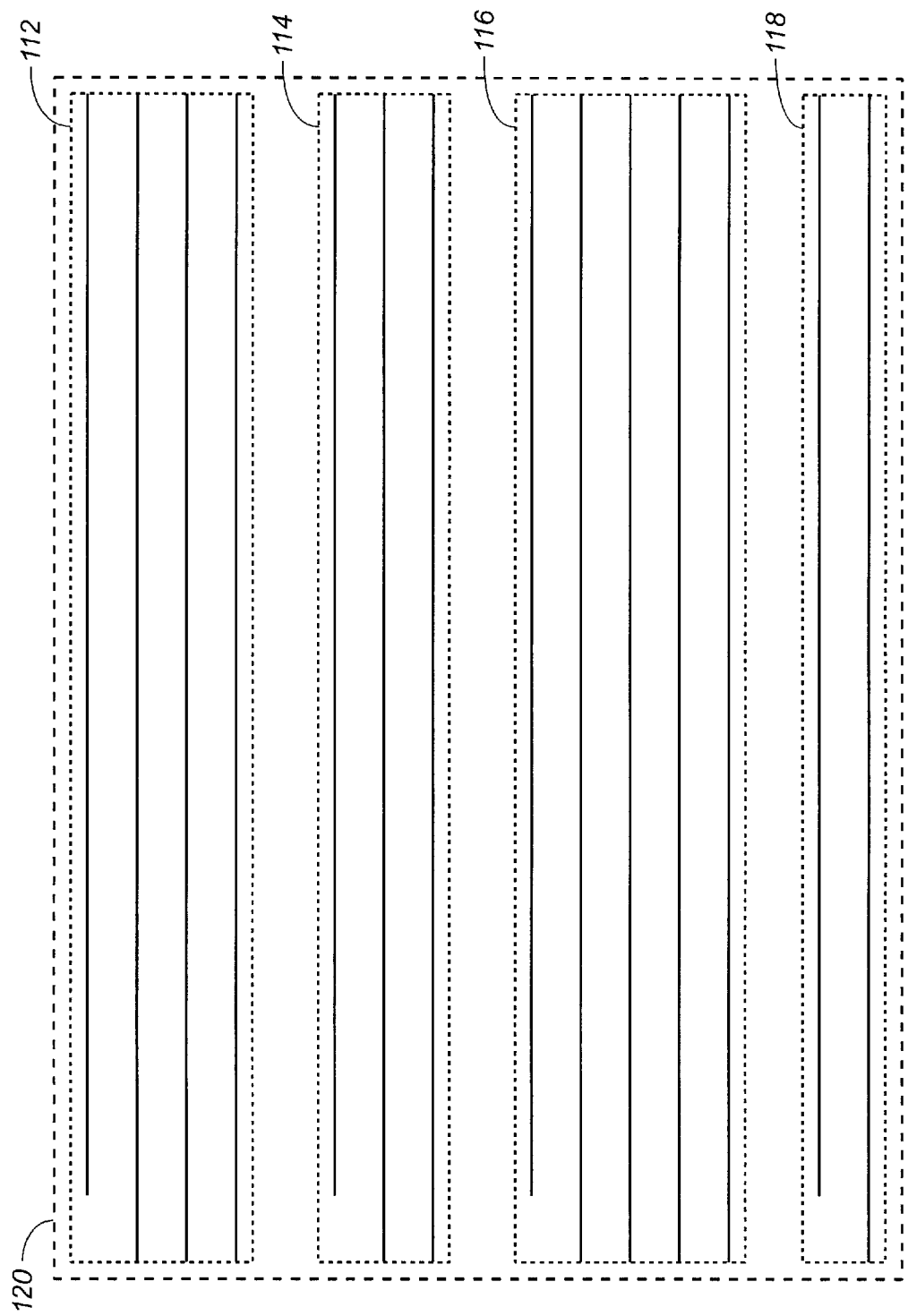
FIG._9

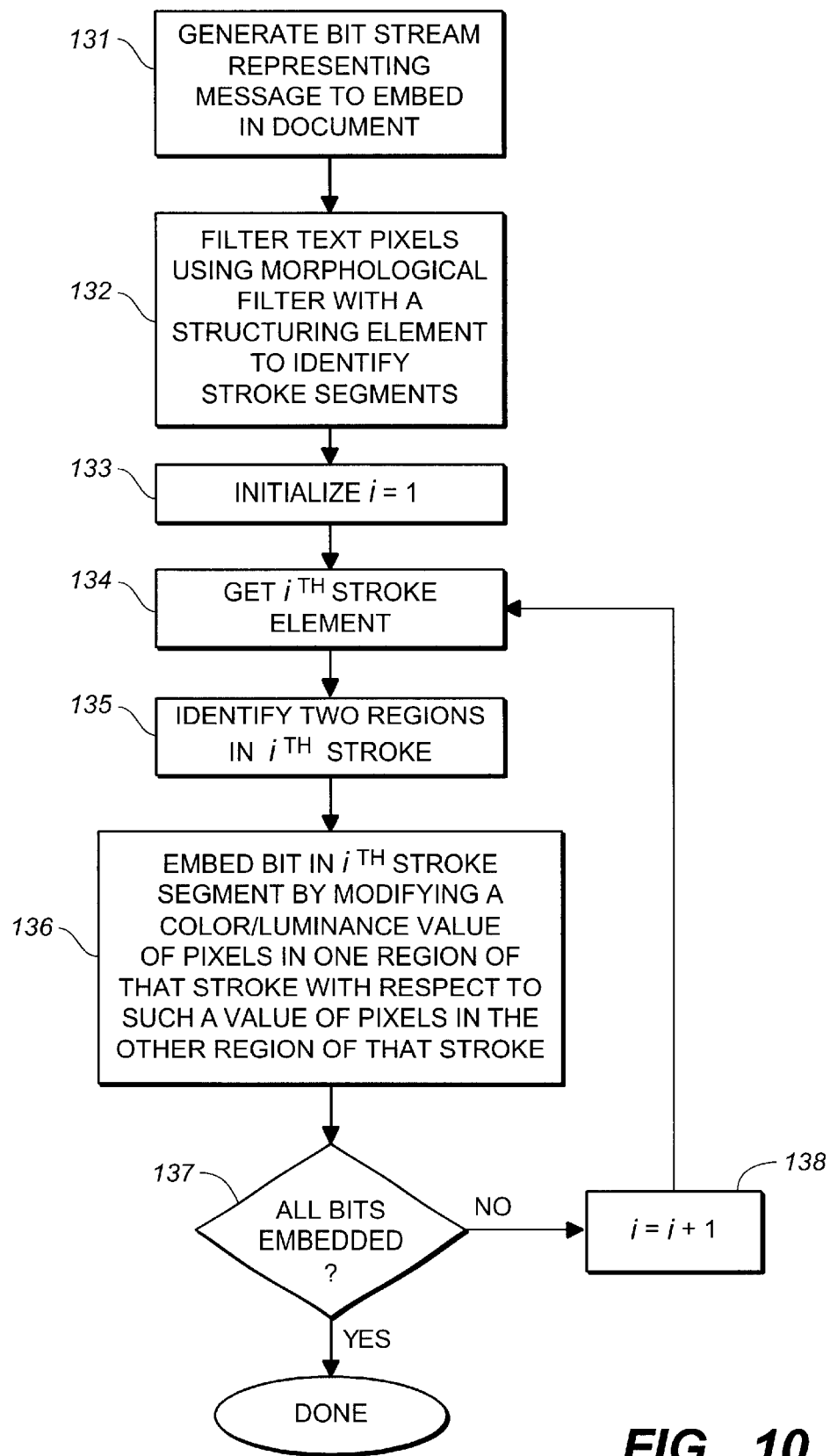
FIG._10

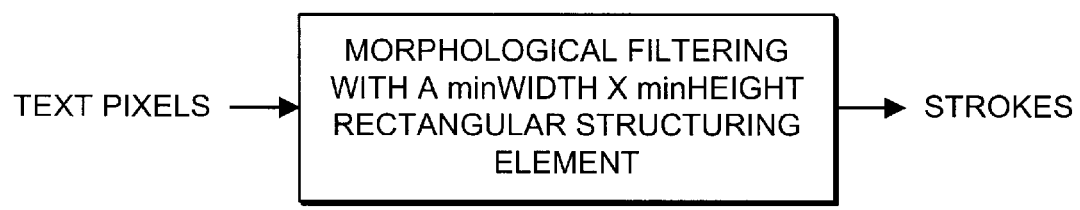
FIG._11
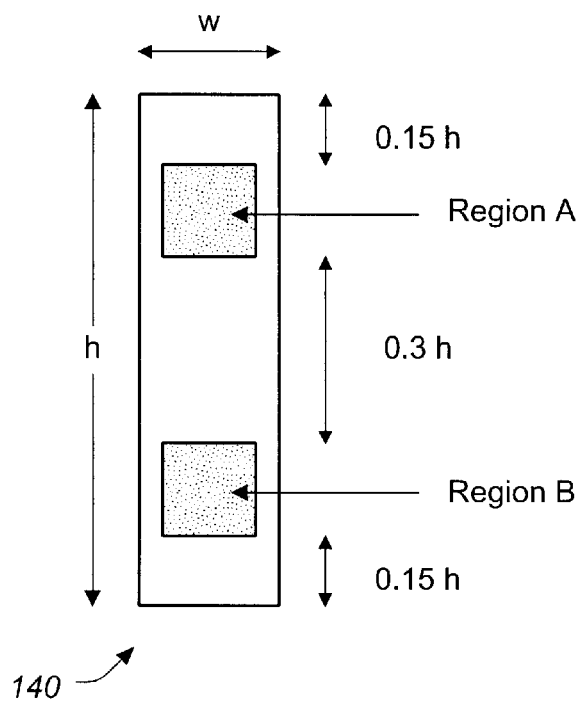
FIG._13

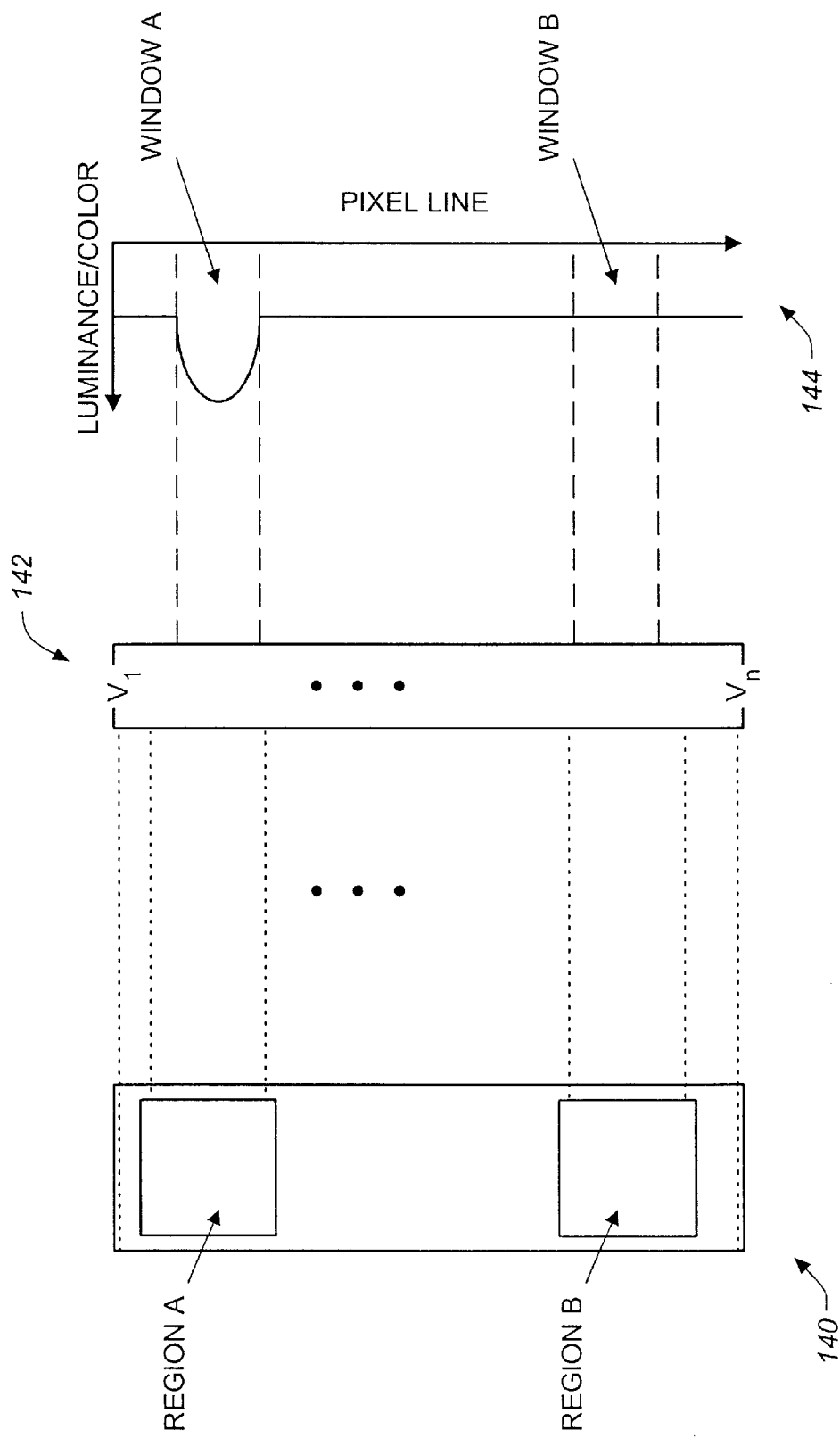
FIG._14

METHOD AND APPARATUS FOR SITE SELECTION FOR DATA EMBEDDING

BACKGROUND OF THE INVENTION

1. Field of the Invention

This invention relates to a method and apparatus for embedding data in text regions of a document in a visually imperceptible way, and to a method and apparatus for extracting such embedded data. The invention particularly concerns a data embedding technique in which stroke segments in text regions are used to embed bits of information in the document by modulating color or luminance in one region of the stroke with respect to another region. The invention also relates to programs of instructions for implementing various aspects of the embedding and extracting processes.

2. Description of the Related Art

Since facilities for reproducing documents are widely available, it has become important in many situations to be able to track document reproduction. A way that has commonly been suggested is for the copier to somehow embed information that is not readily perceptible visually but can nonetheless be recovered by machine optical scannings. One proposed approach is to add a number of low-amplitude perturbations to the original image and then correlate those perturbations with images of suspected copies. If the correlations are as expected, then the suspected document is very probably a copy. However, this approach tends to introduce an element of judgment, since it is based on varying degrees of correlation. Also, it does not lend itself well to embedding actual messages, such as copier serial numbers.

Another approach is to employ half-toning patterns. If the dither matrices employed to generate a half-toned output differ in different segments of an image, information can be gleaned from the dither-matrix selections in successive regions. But this approach is limited to documents generated by half-toning, and it works best for those produced through the use of so-called clustered-dot dither matrices, which are not always preferred.

Both of these approaches are best suited to documents, such as photographs, that consist mainly of continuous-tone images. In contrast, the vast majority of reproduced documents consist mainly of text, so workers in this field have proposed other techniques, which take advantage of such documents' textual nature. For example, one technique embeds information by making slight variations in inter-character spacing. Such approaches lend themselves to embedding of significant amounts of information with essentially no effect on document appearance. However, such approaches are not well suited for use by photocopiers, which do not receive the related word processor output and thus may not be able to identify actual text characters reliably.

Thus, what is needed is a data embedding technique that exhibits advantages of text-based approaches in a way that is more flexible and robust than traditional approaches.

SUMMARY OF THE INVENTION

Objects of the Invention

Therefore, it is an object of the present invention to provide a technique that effectively and robustly identifies and selects sites in text regions of a document and embeds data in such sites in a visually imperceptible way.

It is another object of this invention to provide such a technique which identifies stroke segments in text as candidate sites for embedding data by differential luminance/color modulation, and to further provide a technique for extracting data so embedded.

Summary

According to one aspect of this invention, a method for embedding a message in a text-containing document is provided. The message embedding method comprises the steps of (a) obtaining a pixel representation of the document; (b) identifying text pixels of the document; (c) identifying stroke segments in the text pixels of the document; and (d) embedding information in at least one identified stroke segment by changing a characteristic value, such as a luminance or color value, of pixels in a first region of that stroke segment with respect to the characteristic value of pixels in a second region of that stroke segment, where the first and second regions are non overlapping.

Another aspect of the invention involves a method for extracting a message embedded in stroke segments in text of a document. The message extracting method comprises the steps of (a) obtaining a pixel representation of the document; (b) identifying text pixels of the document; (c) identifying the stroke segments in the text pixels of the document; and (d) measuring a value, such as an average value, representative of a characteristic, such as luminance or color, of pixels in a first region of each identified stroke segment with respect to such a value representative of the characteristic of pixels in a second region of that stroke segment to determine the presence or absence of a bit embedded in that stroke segment, where the first and second regions are non overlapping.

In other aspects of the invention, apparatuses are provided for embedding a message in a text-containing document, and for extracting a message so embedded. The message embedding/extracting apparatuses include a scanner that outputs a pixel representation of the document, and circuitry that processes the output from the scanner. Such circuitry includes a text pixel identifying circuit, a stroke segment identifying circuit, and further includes an embedding or extracting circuit. These circuits may have their processing capability hardwired therein, or they may be software controlled. The message embedding/extracting apparatuses may be embodied in a photocopier or a computer system having an input device, such as a scanner, and a processor for performing the embedding and/or extracting operations in accordance with the invention.

In accordance with further aspects of the invention, each of the above-described methods or steps thereof may be embodied in a program of instructions (e.g., software) which may be stored on, or conveyed to, a computer or other processor-controlled device for execution. Alternatively, the method(s) may be implemented using hardware or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 is a block diagram illustrating major components in an image reproduction system, such as a photocopier, that is suitable for carrying out various aspects of the present invention;

FIG. 2A is a block diagram illustrating components in a typical computer system that is suitable for carrying out various aspects of the invention;

FIG. 2B is a block diagram illustrating various components which may be used to implement a processor in accordance with embodiments of the invention;

FIG. 3 is a flow diagram illustrating an exemplary set of operations that may be performed in accordance with embodiments of the invention;

FIG. 4 is a flow diagram illustrating the text segmentation, de-skewing and page layout extraction operations of the embedding technique;

FIG. 5 is a schematic diagram that illustrates low resolution pixel identification;

FIG. 6 is a schematic diagram that depicts centroids of connected sets of such pixels;

FIG. 7 is a schematic diagram showing the grouping of those centroids into word- and line-sized sets;

FIG. 8 is a schematic diagram depicting lines having the best least-squares fits to line-sized centroid sets;

FIG. 9 is a schematic diagram illustrating a bounding box by which the grid of cells is established; and FIG. 10 is a flow diagram illustrating the manner in which a bit stream to embed is generated, embedding sites are identified, and bits are embedded;

FIG. 11 is a schematic diagram illustrating the process of stroke extraction;

FIG. 12 illustrates vertical strokes identified in a section of text of a scanned document; and FIG. 13 illustrates the active regions in a stroke that may be modulated to embed a bit of information, in accordance with embodiments of the invention.

FIG. 14 is a schematic diagram illustrating aspects of bit extraction, according to embodiments of the invention.

DESCRIPTION OF THE PREFERRED EMBODIMENTS

FIG. 1 illustrates major components in a typical document reproduction system 10, such as a photocopier, in which the techniques of the present invention can be employed. An input device 12, such as a scanner or scanning component of a photocopier, generates as its output electrical signals that digitally represent the contents (image, text and/or graphics) of a document that it has scanned. If input device 12 is an optical scanner or other optical device such as a camera, then the input signals to input device 12 are optical in nature and its output representation conveys digital values of optical samples taken at locations along multiple scan lines. The digital representation may be gray scale or color, but each pixel value should include one (in the case of gray scale) or more (typically three or four in the case of color) multiple-bit components. A typical value resolution is eight bits per component per pixel.

A processor 14 performs a number of operations on the raw digital document, such as text enhancement, color correction, and, in accordance with the present invention, hidden-information embedding and/or hidden-information extracting. The various functions performed by the processor in processing the raw digital document received from input device 12 may be implemented in a variety of ways including by software and/or hardware in a photocopier or general-purpose computer.

An output device 16, such as a printer or printing component of a photocopier, receives electrical signals representing of the document thus processed and renders a physical copy of the document. The printer or printing component is typically, but not necessarily, a laser printer and has multiple-bit-per-scanner-pixel value resolution for each component. This can be achieved by affording multiple-bit-per-printer-pixel value resolution and/or by affording a spatial resolution that exceeds that of the scanner.

FIG. 2A shows the general configuration of typical computer system 20 which may be used to implement an image reproduction system according to the present invention. Central processing unit (CPU) 21 provides computing resources and controls the computer. CPU 21 may be implemented with a microprocessor or the like, and may also include a graphics processor and/or a floating point coprocessor for mathematical computations. Computer 20 further includes system memory 22 which may be in the form of random-access memory (RAM) and read-only memory (ROM).

A number of controllers and peripheral devices are also provided. Input control 23 represents an interface to one or more input devices 24, such as a keyboard, mouse or stylus. A storage control 26 is an interface to a storage device 27 that includes a storage medium such as magnetic tape or disk, or an optical medium that may be used to record programs of instructions for operating systems, utilities and applications which may include embodiments of programs that implement various aspects of the present invention. Display control 28 provides an interface to display device 29 which may be a cathode ray tube (CRT) or thin film transistor (TFT) display. Scanner control 30 represents an interface to scanner device 31 such as an optical scanner. Printer control 32 represents an interface to printer device 33 that is an output device like a laser printer. Communications control 34 interfaces with communication device 35 which may be a modem or other network connection. Programs that implement various aspects of this invention may be transmitted to computer system 20 from a remote location (e.g., a server) over a network.

Devices like scanner device 31 may serve as input device 12 and devices like printer device 33 may serve as output device 16. Other components shown in the figure may be used to implement processor 14.

In the embodiment shown, all major system components connect to bus 25 which may represent more than one physical bus. For example, some personal computers incorporate only a so called. Industry Standard Architecture (ISA) bus. Other computers incorporate an ISA bus as well as a higher bandwidth bus conforming to some bus standard such as the VESA local bus standard or the PCI local bus standard. A bus architecture is not required to practice the present invention.

The functions required to practice various aspects of the present invention can be implemented in processor 14 in a wide variety of ways including with software which can be loaded into the computer or photocopier from a storage device, such as device 27, and executed by a microprocessor, such as CPU 21. More broadly, such software may be conveyed by a variety machine-readable medium including magnetic tape or disk, optical disc, infrared signals, and baseband or modulated communication paths throughout the electromagnetic spectrum including from supersonic to ultraviolet frequencies.

Processor 14 may also be implemented with discrete logic circuits, one or more application specific integrated circuits (ASICs), digital signal processors, program-controlled processors, or the like. As shown schematically in FIG. 2B, these components may be configured to form circuits, such as a text pixel identifying circuit 37, a stroke segment identifying circuit 38, and a bit embedding circuit 39 or bit extracting circuit 40 which may include summing, averaging and comparator circuits 40a, 40b and 40c respectively, that perform the various functions of the invention. In the form of hardware, processor 14 can be embodied in the computer or photocopier or on an option card that can be inserted into an available card slot.

Inasmuch as the data embedding and/or extracting techniques of the present invention may be implemented using hardware, software, or combination thereof, it is to be understood that the block and flow diagrams show the performance of certain specified functions and relationships thereof. The boundaries of these functional blocks have been arbitrarily defined herein for convenience of description. Alternate boundaries may be defined so long as the specified functions are performed and relationships therebetween are appropriately maintained. The diagrams and accompanying description provide the functional information one skilled in the art would require to fabricate circuits or to write software code to perform the processing required.

FIG. 3 depicts an exemplary set of functions that processor 14 may perform in accordance with the invention. Block 41 represents a text segmentation operation that involves the identification of those pixels representing the text portion of a scanned document. Block 42 represents an operation in which the processor reorients text that is canted, perhaps because the original document was oriented improperly on the scanner. More specifically, processor 14 generates a "de-skewed" pixel representation of the scanned document by interpolating among the pixel rows of the scanned pixel representation such that resulting image pixel rows are parallel to the text pixel rows. A page layout operation is performed in block 43. This involves grouping the text pixels into words, lines and paragraphs. In block 44, a bit stream to be embedded in text is generated. The bit stream may be provided with an error correction code (ECC). Block 45 represents an operation in which specific sites in which bits are to be embedded are identified, and block 46 involves the actual embedding of the bits.

FIG. 4 is an overview of the text segmentation, de-skewing and page layout analysis operations. In block 47 the pixel representation of the scanned document is divided into multiple-pixel grid cells. This operation begins by considering the scanned representation as a whole. For this purpose, it is beneficial to employ a low-resolution rendition of the scanned document. The low-resolution can be performed optically by momentarily adjusting the optics of a scanner to a lower resolution. For example, the optics of a 300 dots per inch (dpi) scanner can be adjusted to take an initial 100 dpi scan. In other cases, the high-resolution output of a fixed-resolution scanner can be filtered electronically with a low-pass filter and the result re-sampled at the lower resolution.

From this low resolution rendition, in block 48 processor 14 identifies pixels considered to be located in text regions. The criterion for identifying such pixels in gray-scale-only documents may be that their brightness or luminance values must be less than a certain threshold. That threshold may be fixed, or it may be determined by taking a histogram of the document's pixel values and selecting all pixels whose brightness/luminance values are below, say, the $25^{th}$ percentile. For a color document, a further requirement that the color saturation be below a certain threshold would typically be imposed. Again, the threshold may be fixed, or it can be derived from, say, histogram values. Also, the saturation threshold applied to a given pixel may depend on that pixel's intensity. Other criteria may also be used to select text regions.

The result will be a pattern of pixels that meet the criteria (block 49). For instance, FIG. 5 illustrates a pattern that can result from the three-letter sequence "Sim." The pixels thus identified are divided into sets of contiguous pixels in block 50 of FIG. 4. FIG. 5 depicts five such sets, identified by the reference numerals 61, 62, 63, 64 and 65. These sets or components correspond roughly to individual characters. However, a pair of characters can be in sufficiently close proximity to result in a single component. It is also possible, as illustrated in FIG. 5, that a single character can be represented by more than one component. For example, the "i" in FIG. 5 results in two components. Likewise, the "m" also results in two components. This is acceptable because the purpose for grouping text-region pixels into components is not to identify characters but rather to provide input into a repeatable way of establishing a reference position. Still, components comprising fewer than eight pixels are not used in further processing, nor are components that are more than two hundred pixels wide or fifty pixels high.

As FIG. 6 illustrates, processor 14 then determines the (sub-pixel-resolution) centroids 71, 72, 73 and 74 of the remaining components' respective smallest enclosing rectangles 75, 76, 77 and 78 (block 51 in FIG. 4). As FIG. 7 illustrates, those centroids are then grouped into sets 81, 82, 83, 84, 85, and 86 of centroids spaced from adjacent centroids in the set by less than a minimum inter-word spacing (block 52 in FIG. 4). That minimum spacing usually bears a predetermined ratio to the average size of the component bounding boxes. These sets are referred to as "words" because they usually correspond to actual text words, although the correspondence is not always exact. These word sets are then divided into groups 87 and 88 of word sets separated from their neighbors by less than a minimum inter-line spacing (block 53 in FIG. 4). Although the correspondence of components to text characters is somewhat rough, the correspondence of the thus-derived word sets to actual words is less so, and the correspondence of line sets of those centroids to text lines is ordinarily quite good in the following sense: although the spacings between words in a line of actual text will occasionally be so great as to result in two line sets of centroids, separate text lines will nearly always result in separate line sets.

With the line sets thus determined, word centroids 91, 92, 93, 94, 95, and 96 are computed from each respective word sets' constituent component centroids. As FIG. 8 illustrates, processor 14 then computes the lines 101, 102, 103, 104, 105 and 106 that have the best least-squares fits to respective line sets' word centroids.

As FIG. 8 suggests, there may be a non-zero skew angle between the lines thus determined and the input scan lines. If so, conventional multi-rate digital-processing techniques are employed to generate the values of pixels arrayed in rows parallel to the least-squares-fit lines thus determined. This de-skewing (block 54 in FIG. 4) may be performed in a two-step process. In the first step, the re-sampling may occur as just described. In the second step, new lines are computed that represent the best least-squares fit through the bottoms of the resultant component positions. Then the data are again re-sampled to generate the values of pixels disposed in rows parallel to the newly computed lines.

With the document now de-skewed processor 14 computes line segments delimited by the end component centroids in respective line sets. Each line segment that is spaced by more than a predetermined inter-paragraph minimum from the preceding line, or that is indented by more than a predetermined minimum indentation from its fellows, is considered to begin a new paragraph, so the line segments are divided into paragraph sets 112, 114, 116, and 118, as shown in FIG. 9 (block 55 of FIG. 4).

It turns out that the process just described of locating paragraphs in this manner is quite repeatable, and so the embedding operation establishes the origin of its grid system at the upper left corner of the smallest rectangle 120 that includes all of the paragraph line-segments sets thus determined. Alternatively, the grid-origin determination can be equivalently determined from the smallest box that bounds the line segments.

Whereas the de-skewing and origin-establishing operations described so far were performed with a low (e.g., 100 dpi) pixel resolution to reduce computational overhead, the document's original, high-resolution image data are now re-sampled with line scans oriented in accordance with the de-skewing operation described above, and the resultant pixel values are divided into 5×5 cells beginning at the just-determined origin. With text segmentation, de-skewing and page layout extraction completed and a grid thus determined, processor 14 embarks upon a message-embedding operation which includes generating a bit stream to embed, identifying embedding sites, and the actual embedding of bits, as depicted in FIG. 10.

A bit stream, which is the binary representation of the message, is generated to embed in the document (block 131). The original binary message may be provided with error correction code (ECC), if desired. The message to be embedded can be of any type desired. For example, it may include the date on which the copy was made, the make and/or the serial number of the photocopier. Typically, the method for recovering the raw message will be publicly available, but the raw message may be encrypted so as to be decipherable by only the manufacturer, owner or other authorized person.

From among the text pixels thus identified, processor 14 selects cells whose pixels may be modulated in color or luminance to embed the bit stream representing the message. First, the processor identifies vertical stroke segments in the text by filtering the text pixels using a morphological filter with a rectangular structuring element that performs an erosion operation followed by a dilation or opening operation (block 132). Morphological filtering is described in William K. Pratt, "Digital Image Processing," John Wiley and Sons, 1991, Chapter 15: Morphological Image Processing, the contents of which is incorporated herein by reference. While vertical strokes are identified in preferred embodiments, in alternative embodiments, diagonal strokes may be identified using an appropriate morphological filter with a diagonal structuring element. In either case, each stroke has its own coordinate system which is defined by the position of the structuring element.

The rectangular structuring element for vertical stroke identification has dimensions minWidth x minHeight pixels, which represents the dimensions of the minimum stroke size to be used. Typical values for minWidth and minHeight are seven and sixteen pixels respectively. The operation of identifying vertical text strokes is illustrated schematically in FIG. 11.

The morphological filtering of text pixels in a segmented and deskewed document to extract vertical strokes is further illustrated in FIG. 12, which shows vertical strokes identified in a section of scanned text. Vertical strokes so identified are denoted in the figure by cross hatching. Each stroke has the capacity to embed a single bit of information. A "0" or a "1" is embedded in a stroke as follows.

With an incremental variable i initialized to 1 (block 133), processor 14 obtains the $i^{th}$ identified stroke (block 134).

Next, that stroke is segmented into two regions, labeled as regions A and B in FIG. 13, using pixel-intensity range and pixel-label continuity constraints (block 135). Regions A and B are rectangular regions, each having a width=w−2 and a height=0.2h, where w and h are the width and height of the current stroke in which a bit is to be embedded. Exemplary locations of regions A and B relative to the length and width of the stroke 140 are shown in FIG. 13. Other locations may be used, provided that the two regions are disjoint and are located in the interior of the stroke so as not to be seriously affected by blurring effects that occur at text boundaries.

Next, in step 136, a bit of information is embedded into the stroke by employing differential luminance/color modulation, that is, by modifying luminance/color values of pixels in one region with respect to such pixel values in the other region. For example, if the bit to be embedded is a "1" the luminance/color of at least some pixels in one of the regions, say region A, is changed by a specified amount, while no change is made to such values of the pixels in the other region, say region B. On the other hand, if a "0" is to be embedded luminance/color of at least some pixels in the other region, say region B, are altered, while no change is made to such values of the pixels in region A. The degree of modulation of the signal is determined by experimentally evaluating the signal-to-noise ratios of a plurality of different makes and models of scanners. The differential threshold is determined by the worst signal-to-noise ratio among those scanners.

Typically, the intensities or luminances of text-region pixels are low and may have been reduced further by a text enhancement operation applied prior to bit embedding. Thus, in the case where luminance values are modulated to generated the differential signal, a bit is preferably embedded by increasing the luminance values of pixels in one region while making no change to such values of the pixels in the other region. The luminance values of pixels in the one region are increased such that the resulting differential signal satisfies the threshold requirement.

After a bit is embedded in the $i^{th}$ stroke, it is determined if all bits have been embedded (block 137). If not, i is incremented by 1 (block 138) and the next identified stroke is obtained (block 134). The operations of blocks 135 and 136 are then repeated for this stroke. The embedding process continues until all bits of the message have been embedded, as determined in block 137, after which the process terminates.

To recover such an embedded message, the copy is first scanned to obtain a pixel representation of the document. Next, text pixels are identified and stroke segments are extracted by morphological filtering of the segmented and deskewed document, as explained above. For each stroke, the difference in color or luminance between pixels in regions A and B is used to detect the presence or absence of an embedded bit in that stroke.

FIG. 14 schematically illustrates one way in which the bit detection process is carried out, according to embodiments of the invention. Within a given stroke 140, the luminance/color values of all pixels along each of lines 1 through n substantially perpendicular to the stroke are summed to generate an n-dimensional column array 142 of values v1 through vn, where n is the number of substantially perpendicular lines of pixels in the stroke. Graphically, the array represents a luminance/color vs. row location profile, such as the one identified by reference numeral 144. In determining whether a bit is embedded, only the data in windows A and B, corresponding to lines of pixels extending through regions A and through B respectively, are considered. The average of the luminance/color array values in one window must be greater than the average of such values in the other window by at least the predetermined threshold to trigger bit recognition. Because the threshold is set based on signal-to-noise characteristics of various scanners, noise artifacts that may effect the difference between these two average values will not be sufficient to trigger a bit recognition.

The average of the luminance/color values in each of the two windows is merely one type of characteristic value for comparison to determine if a bit has been embedded. Other characteristic values may also be used.

As the foregoing description demonstrates, the present invention provides a fast and robust technique for identifying stroke segments in a text-containing document and embedding data therein using a differential signal, and for extracting data so embedded. The embedding and extracting techniques may be implemented in a photocopier or on a personal computer using software or hardware.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for embedding a message in a text-containing document, comprising the steps of:
   obtaining a pixel representation of the document;
   identifying text pixels of the document;
   identifying stroke segments in the text pixels of the document; and
   embedding information in at least one identified stroke segment by changing a characteristic value of pixels in a first region of that stroke segment with respect to the characteristic value of pixels in a second region of that stroke segment, wherein the first and second regions are non overlapping.

2. The method of claim 1, wherein the characteristic value is a color or luminance value.

3. The method of claim 1, wherein the step of identifying stroke segments is carried out by filtering text pixels using a morphological filter having a structuring element defining minimum stroke segment dimensions.

4. The method of claim 3, wherein the stroke segments are substantially vertical.

5. The method of claim 1, wherein the first and second regions in each identified stroke segment are disjoint and located in interior regions of that stroke segment.

6. The method of claim 1, wherein the step of embedding information comprises embedding a single bit of information in that stroke segment by changing the characteristic value of pixels in one or the other of the first or second regions but not both.

7. A method for extracting a message embedded in stroke segments in text of a document, comprising the steps of:
   obtaining a pixel representation of the document;
   identifying text pixels of the document;
   identifying the stroke segments in the text pixels of the document; and
   measuring a value representative of a characteristic of pixels in a first region of each identified stroke segment with respect to such a value representative of the characteristic of pixels in a second region of that stroke segment to determine the presence or absence of a bit embedded in that stroke segment, wherein the first and second regions are non overlapping.

8. The method of claim 7, wherein the characteristic is color or luminance.

9. The method of claim 7, and the representative value is an average.

10. The method of claim 7, wherein the step of identifying stroke segments is carried out by filtering text pixels using a morphological filter having a structuring element defining minimum stroke segment dimensions.

11. The method of claim 10, wherein the stroke segments are substantially vertical.

12. The method of claim 7, wherein the first and second regions in each identified stroke segment are disjoint and located in interior regions of that stroke segment.

13. The method of claim 7, wherein the measuring step comprises, for each identified stroke
   summing the characteristic values of pixels along each of pixel line within the first region to generate a first set of summed values,
   summing the characteristic values of pixels along each pixel line within the second region to generate a second set of summed values,
   computing the average of the first set of summed values,
   computing the average of the second set of summed values, and
   comparing the average of the first set with the average of the second set to determine the presence or absence of a bit embedded in that stroke segment.

14. An apparatus for embedding a message in a text-containing document, the apparatus comprising:
   a scanner that outputs a pixel representation of the document;
   a text pixel identifying circuit in communication with the scanner;
   a stroke segment identifying circuit, in communication with the text pixel identifying circuit; and
   an embedding circuit, in communication with the stroke segment identifying circuit, that embeds information in each identified stroke segment by changing a characteristic value of pixels in a first region of that stroke segment with respect to the characteristic value of pixels in a second region of that stroke segment, wherein the first and second regions are non overlapping.

15. The apparatus of claim 14, wherein the characteristic value is a color or luminance value.

16. The apparatus of claim 14, wherein the stroke segment identifying circuit comprises a morphological filter having a structuring element defining minimum stroke segment dimensions to identify stroke segments in text pixels.

17. The apparatus of claim 16, wherein the stroke segments are substantially vertical.

18. The apparatus of claim 14, wherein the first and second regions in each identified stroke segment are disjoint and located in interior regions of that stroke segment.

19. The apparatus of claim 14, wherein the embedding circuit embeds information in each identified stroke segment by embedding a single bit of information in that stroke segment by changing the characteristic value of pixels in one or the other of the first or second regions but not both.

20. The apparatus of claim 14, wherein the text pixel identifying circuit, the stroke segment identifying circuit, and the embedding circuit are embodied as a single integrated circuit.

21. An apparatus for extracting a message embedded in stroke segments in text of a document, the apparatus comprising:

a scanner that outputs a pixel representation of the document;

a text pixel identifying circuit in communication with the scanner;

a stroke segment identifying circuit, in communication with the text pixel identifying circuit; and an extracting circuit, in communication with the stroke segment identifying circuit, that measures a value representative of a characteristic of pixels in a first region of that stroke segment with respect to such a value representative of the characteristic of pixels in a second region of that stroke segment to determine the presence or absence of a bit embedded in that stroke segment, wherein the first and second regions are non overlapping.

22. The apparatus of claim 21, wherein the characteristic is color or luminance.

23. The apparatus of claim 21, and the representative value is an average.

24. The apparatus of claim 21, wherein the stroke segment identifying circuit comprises a morphological filter having a structuring element defining minimum stroke segment dimensions to identify stroke segments in text pixels.

25. The apparatus of claim 24, wherein the stroke segments are substantially vertical.

26. The apparatus of claim 21, wherein the first and second regions in each identified stroke segment are disjoint and located in interior regions of that stroke segment.

27. The apparatus of claim 21, wherein the extracting circuit comprises a summing circuit that sums the characteristic values of pixels along each pixel line within the first region to generate a first set of summed values, and that sums the characteristic values of pixels along each pixel line within the second region to generate a second set of summed values, an averaging circuit that computes the average of the first set of summed values, and that computes the average of the second set of summed values, and a comparator that compares the average of the first set with the average of the second set to determine the presence or absence of a bit embedded in that stroke segment.

28. The apparatus of claim 21, wherein the text pixel identifying circuit, the stroke segment identifying circuit, and the extracting circuit are embodied as a single integrated circuit.

29. A machine-readable medium embodying a program of instructions for causing a machine to perform a method of embedding a message in a text-containing document, the program of instructions comprising instructions for:

obtaining a pixel representation of the document;

identifying text pixels of the document;

identifying stroke segments in the text pixels of the document; and embedding information in at least one identified stroke segment by changing a characteristic value of pixels in a first region of that stroke segment with respect to the characteristic value of pixels in a second region of that stroke segment, wherein the first and second regions are non overlapping.

30. The machine-readable medium of claim 29, wherein the characteristic value is a color or luminance value.

31. The machine-readable medium of claim 29, wherein the step of identifying stroke segments is carried out by filtering text pixels using a morphological filter having a structuring element defining minimum stroke segment dimensions.

32. The machine-readable medium of claim 31, wherein the stroke segments are substantially vertical.

33. The machine-readable medium of claim 29, wherein the first and second regions in each identified stroke segment are disjoint and located in interior regions of that stroke segment.

34. The machine-readable medium of claim 29, wherein the step of embedding information comprises embedding a single bit of information in that stroke segment by changing the characteristic value of pixels in one or the other of the first or second regions but not both.

35. A machine-readable medium embodying a program of instructions for causing a machine to perform a method of extracting a message embedded in stroke segments in text of document, the program of instructions comprising instructions for:

obtaining a pixel representation of the document;

identifying text pixels of the document;

identifying the stroke segments in the text pixels of the document; and measuring a value representative of a characteristic of pixels in a first region of each identified stroke segment with respect to such a value representative of the characteristic of pixels in a second region of that stroke segment to determine the presence or absence of a bit embedded in that stroke segment, wherein the first and second regions are non overlapping.

36. The machine-readable medium of claim 35, wherein the characteristic is color or luminance.

37. The machine-readable medium of claim 35, and the representative value is an average.

38. The machine-readable medium of claim 35, wherein the step of identifying stroke segments is carried out by filtering text pixels using a morphological filter having a structuring element defining minimum stroke segment dimensions.

39. The machine-readable medium of claim 38, wherein the stroke segments are substantially vertical.

40. The machine-readable medium of claim 35, wherein the first and second regions in each identified stroke segment are disjoint and located in interior regions of that stroke segment.

41. The machine-readable medium of claim 35, wherein the measuring step comprises, for each identified stroke summing the characteristic values of pixels along each of pixel line within the first region to generate a first set of summed values, summing the characteristic values of pixels along each pixel line within the second region to generate a second set of summed values, computing the average of the first set of summed values, computing the average of the second set of summed values, and comparing the average of the first set with the average of the second set to determine the presence or absence of a bit embedded in that stroke segment.

42. An apparatus for embedding a message in a text-containing document, the apparatus comprising:

means for outputting a pixel representation of the document;

means for identifying text pixels in the pixel representation of the document;

means for identifying stroke segments in the text pixels of the document; and means for embedding information in each identified stroke segment by changing a characteristic value of pixels in a first region of that stroke segment with respect to the characteristic value of pixels in a second region of that stroke segment, wherein the first and second regions are non overlapping.

43. The apparatus of claim 42, wherein the characteristic value is a color or luminance value.

44. The apparatus of claim 42, wherein the stroke segments identifying means comprises a morphological filter having a structuring element defining minimum stroke segment dimensions to identify stroke segments in text pixels.

45. The apparatus of claim 44, wherein the stroke segments are substantially vertical.

46. The apparatus of claim 42, wherein the first and second regions in each identified stroke segment are disjoint and located in interior regions of that stroke segment.

47. The apparatus of claim 42, wherein the information embedding means embeds information in each identified stroke segment by embedding a single bit of information in that stroke segment by changing the characteristic value of pixels in one or the other of the first or second regions but not both.

48. An apparatus for extracting a message embedded in stroke segments in text of a document, the apparatus comprising:

means for outputting a pixel representation of the document;

means for identifying text pixels in the pixel representation of the document;

means for identifying the stroke segments in the text pixels of the document; and means for measuring a value representative of a characteristic of pixels in a first region of that stroke segment with respect to such a value representative of the characteristic of pixels in a second region of that stroke segment to determine the presence or absence of a bit embedded in that stroke segment, wherein the first and second regions are non overlapping.

49. The apparatus of claim 48, wherein the characteristic is color or luminance.

50. The apparatus of claim 48, and the representative value is an average.

51. The apparatus of claim 48, wherein the stroke segments identifying means comprises a morphological filter having a structuring element defining minimum stroke segment dimensions to identify stroke segments in text pixels.

52. The apparatus of claim 51, wherein the stroke segments are substantially vertical.

53. The apparatus of claim 48, wherein the first and second regions in each identified stroke segment are disjoint and located in interior regions of that stroke segment.

54. The apparatus of claim 48, wherein the measuring means comprises means for summing the characteristic values of pixels along each pixel line within the first region to generate a first set of summed values, and for summing the characteristic values of pixels along each pixel line within the second region to generate a second set of summed values, means for computing the average of the first set of summed values, and for computing the average of the second set of summed values, and means for comparing the average of the first set with the average of the second set to determine the presence or absence of a bit embedded in that stroke segment.

* * * * *